United States Patent
Murali et al.

(10) Patent No.: US 7,455,823 B2
(45) Date of Patent: Nov. 25, 2008

(54) PROCESS FOR THE PREPARATION OF MICRON/NANO SIZED INORGANIC MATERIAL

(75) Inventors: Sastry Murali, Pune (IN); Rautaray Debabrata, Maharasthra (IN)

(73) Assignee: Council of Scientific & Industrial Research, New Delhi (IN)

( * ) Notice: Subject to any disclaimer, the term of this patent is extended or adjusted under 35 U.S.C. 154(b) by 382 days.

(21) Appl. No.: 11/360,545

(22) Filed: Feb. 23, 2006

(65) Prior Publication Data

US 2008/0260615 A1 Oct. 23, 2008

(30) Foreign Application Priority Data

Mar. 31, 2005 (IN) .......................... 817/DEL/2005

(51) Int. Cl.
*C01B 31/24* (2006.01)
*C01B 17/96* (2006.01)
*C01F 11/18* (2006.01)
*C01F 11/46* (2006.01)

(52) U.S. Cl. .................... 423/430; 423/554; 423/561.1; 423/592.1; 423/635; 423/636; 423/594.19; 423/604; 423/608; 423/606; 977/773; 977/776; 977/777; 977/811

(58) Field of Classification Search ................. 423/430, 423/554, 561.1, 592.1, 635, 636, 594.19, 423/604, 608, 606; 977/773, 776, 777, 811
See application file for complete search history.

(56) References Cited

U.S. PATENT DOCUMENTS

| 4,579,173 | A | * | 4/1986 | Rosensweig et al. | ........ 166/248 |
| 5,733,458 | A | | 3/1998 | Kitazawa et al. | ............ 210/695 |
| 2006/0182664 | A1 | * | 8/2006 | Peck et al. | ................... 422/102 |

OTHER PUBLICATIONS

Aizenberg et al., "Oriented growth of calcite controlled by self-assembled monolayers of functionalized alkanethiols supported on gold and silver," *J. Am. Chem. Soc.*, 121:4500-4509, 1999.
Chen et al., "Langmuir-blodgett fabrication of two-dimensional robust cross-linked nanoparticle assemblies," *Langmuir*, 17:2878-2884, 2002.
Choudhury et al., "Crystallization of prussian blue analogues at the air-water interface using an octadecylamine monolayer as a template," *Langmuir*, 18:7409-7414, 2002.
Heywood and Mann et al., "Organic template-directed inorganic crystallization: oriented nucleation of $BaSO_4$ under compressed langmuir monolayers," *J. Am. Chem. Soc.*, 114:4681-4686, 1992.
Heywood and Mann et al., "Template-directed inorganic crystallization: oriented nucleation of barium sulfate under langmuir monolayers of an aliphatic long chain phosphonate," *Langmuir.*, 8:1492-1498, 1992.
Kang et al., "Brewstar angle microscopy of a magnetic nanoparticle/polymer complex at the air/water interface," *Langmuir*, 12:4345-4349, 1996.
Küther et al., "Templated crystallisation of calcium and strontium carbonates on centered rectangular self-assembled monolayer substrates," *Chem. Eur. J.*, 4:1834-1842, 1998.
Landau et al., "Transfer of structural information from langmuir monolayers to three-dimensional growing crystals," *Nature.*, 318:353-356, 1985.
Kang et al., "In situ observation of domain structure in monolayers of arachidic acid/$\gamma$-$Fe_2O_3$ nanoparticle complexes at the air/water interface," *J. Phys. Chem. B*, 106:9341-9346, 2002.
Mann et al., "Molecular recognition in biomineralization," *Nature*, 332:119-124, 1988.
Mann and Ozin, "Synthesis of inorganic materials with complex form," *Nature*, 382:313-318, 1996.
Sastry et al., "On the morphology of $SrCO_3$ crystals grown at the interface between two immiscible liquids," *Bull. Mat. Sci.*, 26:283-288, 2003.
Sastry et al., Benzene- and anthracene-mediated assembly of gold nanoparticles at the liquid-liquid interface, *Langmuir*, 18:6478-6483, 2002.
Tolnai et al., "Preparation and characterization of surface-modified silica-nanoparticles," *Langmuir*, 17:2683-2687, 2001.
Travaille et al., "Aligned growth of calcite crystals on a self-assembled monolayer," *Adv. Mater.*, 14:492-495, 2002.
Uzgiris and Kornberg et al., "Two-dimensional crystallization technique for imaging macromolecules, with application to antigen-antibody-complement complexes," *Nature.*, 301:125, 1983.
Mann et al., "Controlled crystallization of $CaCO_3$ under stearic acid monolayers," *Nature*, 334:692-695, 1988.
Sastry et al., "Morphology of $BaSO_4$ crystals grown at the liquid-liquid interface," *CrystEnggCom.*, 45:1-4, 2001.

* cited by examiner

*Primary Examiner*—Timothy C Vanoy
(74) *Attorney, Agent, or Firm*—Fulbright & Jaworski LLP

(57) ABSTRACT

The invention discloses methods for making micron/nano meter sized particles of various inorganic materials such as minerals/oxides/sulphides/metals/ceramics at a steadily expanding liquid-liquid interface populated by suitable surfactant molecules that spontaneously organize themselves into superstructures varying over large length-scales. This experiment is realized in a radial Hele-Shaw cell where the liquid-liquid interfacial growth rate and consequently time scales such as arrival of surfactant molecules to the interface, the hydrodynamic flow effect to modulate the material organization into super structures at the dynamic charged interface.

15 Claims, No Drawings

PROCESS FOR THE PREPARATION OF MICRON/NANO SIZED INORGANIC MATERIAL

FIELD OF THE INVENTION

The present invention relates to a process for the preparation of micron/nano sized inorganic material. More particularly it relates to a process for producing micron/nano-sized particles of novel minerals, metals, sulphides, oxides and ceramics superstructures as well. Further it relates to methods of producing micron/nano-sized mineral, ceramic, oxide and metal particle which are further organized into higher order superstructures of varying complexity by using a novel dynamic charged interface for the large scale production thereof. The development of this protocol for the large scale synthesis of advanced materials with control over crystallographic structure, size and morphology will be driven by numerous technological and medical applications, e.g., as advanced ceramics, catalysts, filler materials, sensors, pigments, used in plastic industries, paper industries and many others.

All publications and patents mentioned in the above specification are herein incorporated by references. While in the foregoing specification, this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

BACKGROUND OF THE INVENTION

Chemical and materials synthesis and its transformation is one of the core industries of world economy. Various techniques have been developed for the generation of such particles, some based on physical and some on chemical principles. In addition to particle size and composition, particle shape plays an important role in modulating its electronic and chemical properties. Since the collective properties of particle assemblies are also critically dependent on the shape of the superstructures. Numerous substances are synthesized using processes that require non-ambient temperatures and/or non-ambient pressures that require capital-intensive equipment. Methods that can produce useful chemicals and materials at conditions closer to ambient conditions and use simple equipment are economically, ecologically, and environmentally more desirable.

Significant research efforts have been devoted for nanostructure processing as a means of achieving materials with commercial requirements in areas as diverse as electronics, pigments, cosmetics, ceramics and medical industries, (Mann et al., *Nature.*, 1996, 382: 313-318;).

Langmuir monolayers have been shown to induce oriented crystallization from solution of proteins (Uzgiris and Kornberg et al *Nature.*, 1983, 301, 125) and other organic and inorganic compounds (Landau et al *Nature.*, 1985, 318, 353). Mann and co-workers have studied the oriented crystallization of $CaCO_3$ under monolayers of stearic acid (Mann et al, *Nature.*, 1988, 334, 692; Mann et al *Nature.*, 1988, 332, 119) Heywood and Mann have studied the oriented nucleation of $BaSO_4$ under compressed Langmuir monolayers of long chain alkyl phosphonate resulted in plate-like out growth as well as bow-tie morphology (Heywood and Mann et al *Langmuir.*, 1992, 8, 1492) and under n-eicosyl sulfate/eicosanoic acid monolayer resulted in unusual and complex morphology of $BaSO_4$ crystals (Heywood and Mann et al *J. Am. Chem. Soc.*, 1992, 114, 4681). Self-assembled monolayers (SAMs) have also been used to grown minerals-such as calcite (Aizenberg et al, *J. Am. Chem. Soc.* 1999, 121, 4500). This often leads to the oriented growth of $CaCO_3$ crystals on surfaces such as terminally functionalized SAMs supported on metal films. (Kuther et al *Chem. Eur. J.* 1998, 4, 1834). Travaille et al. have shown interesting hexagonal organization of highly oriented calcite crystals on Au (111) films covered by a monolayer of 16-mercaptohexadecanoic acid (Travaille et al *Adv. Mater.* 2002, 14, 492-495). Chen et al have shown two-dimensional nanoparticle cross-linked networks were constructed by using the Langmuir-Blodgett technique, where neighboring particles were chemically bridged by bifunctional linkers at the air/water interface (Chen et al, *Langmuir* 2001, 17, 2878). Crystallization of Prussian blue analogues has been observed using octadecylamine monolayer as a template at the air-water interface (Choudhury et al, *Langmuir* 2002, 18, 7409). Controlled silanization of Stober silica particles have been prepared by using monofunctional trimethylsilyl N,N-dimethyl carbamate at the air-water interface resulted in (Tolnai et al, *Langmuir* 2001, 17, 2683). The Langmuir layer behavior of a polymer/magnetite nanoparticle complex at the air/water interface resulted in $Fe_3O_4$ nanoparticles with an average diameter of 8.5±1.3 nm (Kang et al, *Langmuir,* 1996, 12, 4345). Also the Langmuir layer behavior of arachidic acid/Á—$Fe_2O_3$ nanoparticle with an average diameter of 8.3 nm complexes was studied at the air/water interface (Lee et al *J. Phys. Chem. B* 2002, 106, 9341). Gold nanoparticles have been organized at the liquid-liquid interface between the gold hydrosol and benzene as well as anthracene in chloroform, where the biphasic mixture results in complete transfer of the gold nanoparticles from the aqueous to the benzene phase and the subsequent assembly of gold nanoparticles at the liquid-liquid interface (Sastry et al, *Langmuir* 2002, 18, 6478). Barite crystals have been grown at liquid-liquid interface between an aqueous solution of $Ba^{2+}$ ions and organic solutions of chloroform and hexane containing fatty acid/fatty amine molecules by reaction with sodium sulfate resulted in flat, plate like morphology (Sastry et al, *CrystEnggCom.* 2001, 45, 1). $SrCO_3$ crystals have been grown at the interface between two immiscible liquids resulted in self-assembled needle shaped strontianite crystallites branching out from the seed crystal (Sastry et al, *Bull. Mat. Sci.* 2003, 26, 283).

U.S. Pat. No. 5,733,458 provided a method for changing the shape of the interface between two materials by applying a magnetic field, which enables the change of the interface shape in an amount at least equal to that conventionally observed on the air-liquid interface be achieved by a magnetic field of significantly lower intensity.

In all the above methods of synthesis of inorganic materials discussed, the charged interface at which crystal synthesis is carried out is static. To the best of our knowledge, there are no reports investigating the role of an expanding charged interface on inorganic material growth. We herein put forth the invention on the synthesis of various inorganic materials at a steadily expanding charged interface between two liquids in a radial Hele-Shaw cell. We observe interesting assembly, morphology and control over the crystallography of various inorganic materials such as mineral/ceramic/oxide/metal/sulfide superstructures with respect to the different experimental conditions used.

The prior art methods for the growth of various inorganic particles teaches us to grow a wide variety of these particles together with the control over their crystal size, shape and morphology but have certain limitations.

The major drawbacks of the prior art processes are:
1. Charge interface is static
2. Higher ordered superstructure is not possible
3. Large scale synthesis is not possible
4. Uniform size control is tough,
5. Complex conditions,
6. Require more maneuvering,
7. Not robust,
8. Not cost effective,
9. Not stable,
10. Morphology control is complex Our process considerably simplifies process for the large-scale synthesis of crystalline inorganic materials with controlled shape, size and morphology and their assembly in to higher ordered structures thereof. Changing simple parameters helps controlling the shape, size and morphology and their assembly in to higher ordered superstructures.

OBJECTIVES OF THE INVENTION

The main object of the invention is to provide a process for the preparation of mineral crystals, which are user friendly.

Another object of the invention is to provide a process for the preparation of shape, size and polymorph controlled mineral crystals that are environmental friendly.

Yet another object of the invention is to provide an economic and efficient process for the preparation of shape, size and polymorph controlled mineral crystals.

Yet another object of this invention is to produce higher ordered superstructures of micron/nano size particles of various inorganic materials on a large scale at a dynamic liquid-liquid interface.

Yet another object of this invention to provide a process for preparing micron/nano size higher ordered superstructures of various inorganic materials in which the plate separation has an effect over the morphology of the crystals at a dynamic liquid-liquid interface.

SUMMARY OF THE INVENTION

In accordance with one embodiment of the process of this invention, metal salts of the desired mineral/oxide/ceramic/sulfide/metal composition are dissolved in water and the metal cation/anion solution is then homogeneously react/reduce with the appropriate reducing/reacting agents and was displaced by lower viscous liquid containing surfactant to cap the particles at the dynamic interface to synthesize desired mineral/metal/ceramic/sulfide/oxide micron/nano size super structures. The concentration of the metal cations/anions and also that of the surfactants determines primary control over particle assembly and morphology.

DETAILED DESCRIPTION OF THE INVENTION

Accordingly, the present invention provides a process for the preparation of micron/nano sized high ordered superstructure inorganic particles at dynamic liquid-liquid interface which comprises displacing a viscous aqueous fluid of appropriate inorganic salts placed in the cell gap in between two float glass plates of a Hele-Shaw cell by an injecting lower viscous non aqueous liquid containing an appropriate capping agent, at a constant volumetric flow rate of 0.01-1.0 ml/min, removing the non aqueous solvent from the above said solution mixture followed by washing the remaining aqueous precipitate with distilled water to obtain the desired high ordered super structure product.

In an embodiment of the present invention the inorganic salt used is selected from the group consisting of calcium chloride, barium chloride, strontium chloride, chloroaurate, chloroplatinate, tetrachloronickelate, chloropalladate, hexafluorotitante, hexaflouorozirconate, phosphotungstate, phosphomolybdate, silicotungstate and a mixture thereof.

In another embodiment the cell gap used in between the two float glass plates of Hele-Shaw cell is at least 100 μm.

In yet another embodiment the viscosity of the displaced and displacing liquid used is at least 0.00027 Pa-s.

In yet another embodiment the viscosity of the displaced aqueous fluid is more than the displacing non aqueous liquid fluid.

In yet another embodiment the capping agent used is surfactant. In yet another embodiment the surfactant used is selected from the group consisting of anionic, cationic, non-ionic surfactant and mixture thereof. In yet another embodiment the surfactant used is selected from the group consisting of stearic acid, eicosonic acid, octadecyl amine, sodium alkyl sulfates, sodium bis-2-ethyl-hexyl sulfosuccinate (AOT), alkyl triethylammonium bromides, alkyl polyoxyethylene monoethers, and mixture thereof.

In yet another embodiment the supersaturation ratio (SSR) of the suitable inorganic salts used is at least 10.

In yet another embodiment the non-aqueous solvent used is an organic solvent.

In yet another embodiment the organic solvent used is chloroform.

In yet another embodiment the micron/nano-sized superstructures observed are generally uniform in shape and size ranging in size from several nano meters to micrometers.

In yet another embodiment the inorganic material obtained is uniform, agglomerate-free and single or multi-component micron/nano size super structure material.

In yet another embodiment the particle size of the inorganic material obtained is in the range of 0.01-100 μm, preferably in the range of 0.0-50 μm.

NOVELTY OF THE INVENTION

The invention discloses methods for making micron/nano meter sized particles of various inorganic materials such as minerals/oxides/sulphides/metals/ceramics at a steadily expanding liquid-liquid interface populated by suitable surfactant molecules that spontaneously organize themselves into superstructures varying over large length-scales. This experiment is realized in a radial Hele-Shaw cell where the liquid-liquid interfacial growth rate and consequently time scales such as arrival of surfactant molecules to the interface, the hydrodynamic flow effect to modulate the material organization into super structures at the dynamic charged interface.

The process of the invention is described hereinbelow with reference to the following examples, which are illustrative and should not be construed to limit the scope of the invention, in any manner.

EXAMPLE 1

This example illustrates the synthesis of calcium carbonate micron/nano sized crystals of higher ordered super structures at an extended liquid-liquid interface, which is realized in a radial Hele-Shaw apparatus. The radial Hele-Shaw cell used in this study was composed of two 1 cm thick, 30×30 cm² float-glass plates. Spacers of size b=300 was used between the top and bottom glass plates. The viscous fluid (mixed aqueous solution of $CaCl_2$ and $Na_2CO_3$) was taken in the cell gap and thereafter, chloroform containing AOT [$C_{20}H_{37}NaO_7S$, M.W.=444.56, ($1 \times 10^{-3}$ M)] was injected through a hole (0.5 mm diameter) drilled at the centre of the top glass plate using an automated fluid delivery system. Experiments was performed at salt solution supersaturation ($S_R$) of ca. 30 (10 mL of $1 \times 10^{-2}$ M aqueous $CaCl_2$ and 10 mL of $1.368 \times 10^{-3}$ M aqueous $Na_2CO_3$) as the displaced fluid with the plate separations ($S_p$) of 300. The experiments were performed at a constant volumetric flow rate (VFR) of chloroform containing surfactant into the aqueous phase (mixed aqueous solutions of $CaCl_2$ and $Na_2CO_3$) of 0.5 mL/min. The evolution of the finger pattern with time was followed for the above cases using a CCD camera connected to a video recorder at an image capture rate of 25 images/sec. On completion of the injection process (typically 15-20 minutes), the organic solution was carefully removed and the remaining aqueous precipitate was washed with copious amounts of double distilled water and placed on Si (111) and on glass substrates for scanning electron microscopy (SEM)/ energy dispersive analysis of X-rays (EDAX) and X-ray diffraction (XRD) measurements respectively.

EXAMPLE 2

This example illustrates the synthesis of calcium carbonate micron/nano sized crystals in a radial Hele-Shaw apparatus. The radial Hele-Shaw cell used in this study was composed of two 1 cm thick, 30×30 cm² float-glass plates. Spacers of size b=300 was used between the top and bottom glass plates. The viscous fluid (mixed aqueous solution of $CaCl_2$ and $Na_2CO_3$) was taken in the cell gap and thereafter, chloroform containing AOT [$C_{20}H_{37}NaO_7S$, M.W.=444.56, ($1 \times 10^{-3}$ M)] was injected through a hole (0.5 mm diameter) drilled at the centre of the top glass plate using an automated fluid delivery system. Experiments was performed at salt solution supersaturation ($S_R$) of ca. 30 (10 mL of $1 \times 10^{-2}$ M aqueous $CaCl_2$ and 10 mL of $1.368 \times 10^{-3}$ M aqueous $Na_2CO_3$) as the displaced fluid with the plate separations ($S_p$) of 300. The experiments were performed at a constant volumetric flow rate (VFR) of chloroform containing surfactant into the aqueous phase (mixed aqueous solutions of $CaCl_2$ and $Na_2CO_3$) of 0.1 mL/min. On completion of the injection process (typically 15-20 minutes), the organic solution was carefully removed and the remaining aqueous precipitate was washed with copious amounts of double distilled water and placed on Si (111) and on glass substrates for scanning electron microscopy (SEM)/energy dispersive analysis of X-rays (EDAX) and X-ray diffraction (XRD) measurements respectively.

EXAMPLE 3

This example illustrates the synthesis of strontium carbonate micron/nano sized crystals of higher ordered super structures at an extended liquid-liquid interface using radial Hele-Shaw apparatus. The radial Hele-Shaw cell used in this study was composed of two 1 cm thick, 30×30 cm² float-glass plates. Spacers of size b=300 were used between the top and bottom glass plates. The viscous fluid (mixed aqueous solution of $SrCl_2$ and $Na_2CO_3$) was taken in the cell gap and thereafter, chloroform containing AOT [$C_{20}H_{37}NaO_7S$, M.W.=444.56, ($1 \times 10^{-3}$ M)] was injected through a hole (0.5 mm diameter) drilled at the centre of the top glass plate using an automated fluid delivery system. Experiments was performed at salt solution supersaturation ($S_R$) of ca. 30 (10 mL of $1 \times 10^{-3}$ M aqueous $SrCl_2$ and 10 mL of $3 \times 10^{-4}$ M aqueous $Na_2CO_3$) as the displaced fluid with the plate separations ($S_p$) of 300. The experiments were performed at a constant volumetric flow rate (VFR) of chloroform into the aqueous phase (mixed aqueous solutions of $SrCl_2$ and $Na_2CO_3$) of 0.5 mL/min. The evolution of the finger pattern with time was followed for the above cases using a CCD camera connected to a video recorder at an image capture rate of 25 images/sec. On completion of the injection process (typically 15-20 minutes), the organic solution was carefully removed and the remaining aqueous precipitate was washed with copious amounts of double distilled water and placed on Si (111) and on glass substrates for scanning electron microscopy (SEM)/ energy dispersive analysis of X-rays (EDAX) and X-ray diffraction (XRD) measurements respectively.

EXAMPLE 4

This example illustrates the synthesis of barium sulfate micron/nano sized crystals of higher ordered super structures at an extended liquid-liquid interface realized in a radial Hele-Shaw apparatus. The radial Hele-Shaw cell used in this study was composed of two 1 cm thick, 30×30 cm² float-glass plates. Spacers of size b=300 were used between the top and bottom glass plates. The viscous fluid (mixed aqueous solution of $BaCl_2$ and $Na_2SO_4$) was taken in the cell gap and thereafter, chloroform containing AOT [$C_{20}H_{37}NaO_7S$, M.W.=444.56, ($1 \times 10^{-3}$ M)] was injected through a hole (0.5 mm diameter) drilled at the centre of the top glass plate using an automated fluid delivery system. Experiments was performed at salt solution supersaturation ($S_R$) of ca. 30 (10 mL of $1 \times 10^{-2}$ M aqueous $BaCl_2$ and 10 mL of $1.368 \times 10^{-3}$ M aqueous $Na_2SO_4$) as the displaced fluid with the plate separations ($S_p$) of 300. The experiments were performed at a constant volumetric flow rate (VFR) of chloroform into the aqueous phase (mixed aqueous solutions of $BaCl_2$ and $Na_2SO_4$) of 0.5 mL/min. The evolution of the finger pattern with time was followed for the above cases using a CCD camera connected to a video recorder at an image capture rate of 25 images/sec. On completion of the injection process (typically 15-20 minutes), the organic solution was carefully removed and the remaining aqueous precipitate was washed with copious amounts of double distilled water and placed on Si (111) and on glass substrates for scanning electron microscopy (SEM)/energy dispersive analysis of X-rays (EDAX) and X-ray diffraction (XRD) measurements respectively.

Details of mineral synthesis in the Hele-Shaw cell are given in the table below.

TABLE 1

| Mineral | SP (µm) | VFR (ml/min) | SSR | Particle size (µm) | Particle shape | Yield (%) | XRD |
| --- | --- | --- | --- | --- | --- | --- | --- |
| $CaCO_3$ | [Frame 1] | 0.5 | [Frame 2] | [Frame 3] | [Frame 4] | 70-80 | Crystalline |
| $CaCO_3$ | 300 | 0.1 | 30 | 0.02-10 | Needles | 70-80 | Crystalline |

TABLE 1-continued

| Mineral | SP (μm) | VFR (ml/min) | SSR | Particle size (μm) | Particle shape | Yield (%) | XRD |
|---|---|---|---|---|---|---|---|
| SrCO$_3$ | 300 | 0.5 | 30 | 0.05-2 | Branched needles | 70-90 | Crystalline |
| BaSO$_4$ | 300 | 0.5 | 30 | 0.2-5 | Spherical assemblies | 70-90 | Crystalline |

*SP: Plate separation
VFR: Volumetric flow rate
SSR: Supersaturation ratio
XRD: X-ray diffraction Advantages of the Process Claimed in the Present Invention are:
1. Charge interface is dynamic
2. Higher ordered superstructure is possible
3. Uniform shape and size control
4. Simple conditions
5. Require less maneuvering
6. Robust
7. Stability
8. Morphology control is easy and thus various types of higher ordered super structures can be obtained.
9. the Hele-Shaw set up can be radial or linear.
10. Control over morphology/structure can be achieved by varying plate separations
11. Control over morphology/structure can be achieved by changing viscosity of the displaced/displacing liquid.
12. Control over morphology/structure can be achieved by changing the supersaturation ratio (SSR) of the suitable inorganic materials.
13. Control over morphology/structure can be achieved by varying the volumetric flow rate for the displacement of the liquid.
14. The inorganic materials produced in accordance with this process are highly pure, uniform, agglomerate-free, single or multi-component micron/nano size super structures.

We claim:

1. A process for the preparation of micron/nano sized high ordered superstructure inorganic particles at dynamic liquid-liquid interface which comprises displacing a viscous aqueous fluid of inorganic salts placed in the cell gap in between two float glass plates of a Hele-Shaw cell by injecting lower viscous non aqueous liquid containing a capping agent, at a constant volumetric flow rate of 0.01-1.0 ml/min, removing the non aqueous solvent from the solution mixture followed by washing the remaining aqueous precipitate with distilled water to obtain the desired high ordered super structure product.

2. The process as claimed in claim 1, wherein the inorganic salt used is selected from the group consisting of calcium chloride, barium chloride, strontium chloride, chloroaurate, chloroplatinate, tetrachloronickelate, chloropalladate, hexafluorotitante, hexaflouorozirconate, phosphotungstate, phosphomolybdate, silicotungstate and a mixture thereof.

3. The process as claimed in claim 1, wherein the cell gap used in between the two float glass plates of Hele-Shaw cell is at least 100 μm.

4. The process as claimed in claim 1, wherein the viscosity of the displaced and displacing liquid used is at least 0.00027 Pa-s.

5. The process as claimed in claim 1, wherein the viscosity of the displaced aqueous fluid is more than the displacing non aqueous liquid fluid.

6. The process as claimed in claim 1, wherein the capping agent used is surfactant.

7. The process as claimed in claim 1, wherein the surfactant used is selected from the group consisting of anionic, cationic, non-ionic surfactant and mixture thereof.

8. The process as claimed in claim 1, wherein the surfactant used is selected from the group consisting of stearic acid, eicosonic acid, octadecyl amine, sodium alkyl sulfates, sodium bis-2-ethyl-hexyl sulfosuccinate (AOT), alkyl triethylammonium bromides, alkyl polyoxyethylene monoethers, and mixture thereof.

9. The process as claimed in claim 1, wherein the supersaturation ratio (SSR) of the inorganic salts used is at least 10.

10. The process as claimed in claim 1, wherein the non-aqueous solvent used is an organic solvent.

11. The process as claimed in claim 10, wherein the organic solvent used is chloroform.

12. The process as claimed in claim 1, wherein the micron/nano-sized superstructures observed are generally uniform in shape and size.

13. The process as claimed in claim 1, wherein the inorganic material obtained is uniform, agglomerate-free and single or multi-component micron/nano size super structure material.

14. The process as claimed in claim 1, wherein the particle size of the inorganic material obtained is in the range of 0.01-100 μm.

15. The process as claimed in claim 14, wherein the particle size of the inorganic material obtained is in the range of 0.01-501 μm.

* * * * *

UNITED STATES PATENT AND TRADEMARK OFFICE
CERTIFICATE OF CORRECTION

PATENT NO. : 7,455,823 B2
APPLICATION NO. : 11/360545
DATED : November 25, 2008
INVENTOR(S) : Sastry Murali et al.

It is certified that error appears in the above-identified patent and that said Letters Patent is hereby corrected as shown below:

In claim 2, column 8, line 15, delete "hexaflouorozirconate" and insert --hexafluorozirconate-- therefor.

In claim 15, column 8, line 55, delete "501" and insert --50-- therefor.

Signed and Sealed this

Twenty-fourth Day of March, 2009

JOHN DOLL
*Acting Director of the United States Patent and Trademark Office*